United States Patent
Pena et al.

(10) Patent No.: US 12,280,969 B2
(45) Date of Patent: Apr. 22, 2025

(54) DEPALLETIZATION SYSTEMS AND METHODS

(71) Applicant: Target Brands, Inc., Minneapolis, MN (US)

(72) Inventors: Ernesto Saldana Pena, Minneapolis, MN (US); Gervasio Mutarelli, Minneapolis, MN (US); Dillon Shirley, Minneapolis, MN (US); Joseph Goodwin, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 18/368,269

(22) Filed: Sep. 14, 2023

(65) Prior Publication Data
US 2025/0091820 A1   Mar. 20, 2025

(51) Int. Cl.
*B65G 59/02*     (2006.01)
*B65G 41/00*     (2006.01)

(52) U.S. Cl.
CPC ......... *B65G 59/026* (2013.01); *B65G 41/003* (2013.01); *B65G 2201/0267* (2013.01)

(58) Field of Classification Search
CPC ...... B65G 1/1378; B65G 69/22; B65G 65/00; B65G 1/0485; B65G 59/00; B65G 59/02; B65G 1/06; B65G 1/0407; B65G 1/1371; B65G 1/065; B65G 1/07; Y10S 414/109
USPC ......... 414/267, 281, 285, 795.4, 796.5, 930; 198/607
See application file for complete search history.

(56) References Cited

U.S. PATENT DOCUMENTS

| | | | | |
|---|---|---|---|---|
| 3,520,427 A | * | 7/1970 | Offen | B66F 9/06 414/535 |
| 3,528,566 A | * | 9/1970 | Weir | B65G 1/1378 187/244 |
| 3,734,311 A | * | 5/1973 | Thompson | B65G 1/1371 414/281 |
| 4,133,436 A | * | 1/1979 | Dahm | B65G 1/08 198/531 |
| 4,787,111 A | * | 11/1988 | Pacek | B65G 69/22 49/369 |
| 5,013,204 A | * | 5/1991 | Leon | B64F 1/322 414/495 |

(Continued)

FOREIGN PATENT DOCUMENTS

DE   102011050437 A1 * 11/2012 ........... B65G 1/0492
DE   102014103413 A1 *  9/2015 ........... B65G 57/035

(Continued)

*Primary Examiner* — Gregory W Adams
(74) *Attorney, Agent, or Firm* — Fish & Richardson P.C.

(57) ABSTRACT

Warehouse automation and methods of handling materials can be used to make depalletization processes more safe and efficient. In some examples, the depalletization systems can include a U-shaped platform lift that supports one or more workers and that defines a location for a pallet of boxes to be unloaded or "depalletized." The U-shaped platform lift can be raised and/or lowered to position the workers at the optimal elevations for transferring, with minimal lifting, the boxes from the pallet to a system of conveyors. Such systems are also reconfigurable in multiple ways to further minimize the manual lifting required for the depalletization process as well as the throughput of the depalletization process.

16 Claims, 9 Drawing Sheets

(56) References Cited

U.S. PATENT DOCUMENTS

| | | | | |
|---|---|---|---|---|
| 5,024,572 | A * | 6/1991 | Tanaka | B65G 1/06 198/456 |
| 5,325,953 | A * | 7/1994 | Doster | B65G 43/08 198/456 |
| 5,476,360 | A * | 12/1995 | Liljevik | B64F 1/324 414/800 |
| 5,791,865 | A * | 8/1998 | Bublitz | B65G 57/245 414/730 |
| 7,740,440 | B2 * | 6/2010 | Hannebauer | B65G 59/02 414/795.8 |
| 7,967,543 | B2 * | 6/2011 | Criswell | B25J 9/0093 414/532 |
| 8,262,334 | B2 * | 9/2012 | Christensen | B65G 41/002 198/581 |
| 8,622,199 | B2 * | 1/2014 | Windfeld | B65G 47/71 198/588 |
| 8,944,239 | B2 * | 2/2015 | Campbell | B65G 41/002 198/588 |
| 9,421,580 | B2 * | 8/2016 | Hansl | B65G 15/22 |
| 9,457,966 | B2 * | 10/2016 | Issing | B65G 1/06 |
| 9,517,492 | B2 * | 12/2016 | Schwarzbauer | B07C 5/34 |
| 10,294,046 | B2 * | 5/2019 | Hart | B65G 67/08 |
| 10,618,752 | B2 * | 4/2020 | Heitplatz | B65G 47/5131 |
| 11,142,399 | B2 | 10/2021 | Ahmann et al. | |
| 2008/0118337 | A1 * | 5/2008 | Vestergaard | B65G 41/008 414/340 |
| 2016/0039619 | A1 * | 2/2016 | Wargo | B66F 7/0666 414/640 |
| 2016/0280477 | A1 * | 9/2016 | Pippin | B65G 67/08 |
| 2017/0136627 | A1 * | 5/2017 | Takaichi | B25J 9/1694 |
| 2020/0377317 | A1 * | 12/2020 | Zoghzoghy | B65G 41/003 |
| 2022/0106134 | A1 * | 4/2022 | Mutarelli | B65G 69/26 |
| 2023/0104427 | A1 * | 4/2023 | Allen | B65G 37/005 198/370.01 |

FOREIGN PATENT DOCUMENTS

| | | |
|---|---|---|
| WO | WO 2003/106304 | 12/2003 |
| WO | WO 2011/000658 | 1/2011 |
| WO | WO 2014/072442 | 5/2014 |

* cited by examiner

DEPALLETIZATION SYSTEMS AND METHODS

TECHNICAL FIELD

This document relates to systems and methods for enhancing warehouse material handling operations. For example, this document relates to systems and methods that make depalletization processes more safe and efficient.

BACKGROUND

Warehouse automation can be used to increase the efficiency of order fulfillment processes. The goals of warehouse automation include the efficient use of space resources, and the elimination of manual steps of the order fulfillment process and to optimize the efficiency of order fulfillment processes. Warehouse automation technology is useful for multiple reasons, such as, to make material handling processes more efficient, to improve worker safety by mitigating ergonomic risks, and to help reduce the occurrences of human error.

SUMMARY

This document describes systems and methods for enhancing warehouse material handling operations. For example, this document describes automation systems and methods that make depalletization processes more safe and efficient. In some examples, the depalletization systems described herein include a U-shaped platform lift that supports one or more workers and that defines a location for a pallet of boxes to be unloaded or "depalletized." The U-shaped platform lift can be raised and/or lowered to position the workers at the optimal elevations for transferring, with minimal lifting, the boxes from the pallet to a system of conveyors. As described below, the system of conveyors is also reconfigurable in multiple ways to further minimize the manual lifting required for the depalletization process.

In one aspect, this disclosure is directed to a system for depalletization that includes a platform lift that is operable to be raised and lowered while supporting one or more workers, the platform lift defining a pallet location where the one or more workers can remove boxes from a pallet while standing on the platform lift; a box discharge conveyor arranged and operable to convey the boxes away from the platform lift; and a transfer conveyor extending between the box discharge conveyor and the pallet location. The box discharge conveyor and the transfer conveyor raise and lower in coordination with the platform lift as the platform lift is raised and lowered.

Such a depalletization system can optionally include one or more of the following features. The depalletization system may also include a pallet conveyance means that is arranged and operable to convey the pallet to the pallet location. The transfer conveyor may extend in a cantilevered arrangement toward the pallet location. The transfer conveyor may comprise an output end adjacent the box discharge conveyor and an input end that is opposite of the output end and that is a free end. The transfer conveyor may be pivotable relative to the box discharge conveyor such that the input end can be moved upward and downward along an arcuate path. The transfer conveyor may be: (i) extendable to increase a length of the transfer conveyor between the input and output ends and/or (ii) retractable to decrease the length of the transfer conveyor between the input and output ends. The platform lift may comprise a U-shaped platform. The U-shaped platform may surround the pallet location on exactly three sides. The depalletization system may also include an empty pallet handling system comprising a pallet lifting device. The pallet lifting device may be arranged and operable to move an empty pallet from the pallet location to an empty pallet conveyance means that is arranged and operable to convey the empty pallet away from the depalletization system.

In another aspect, this disclosure is directed to a depalletization method that includes: conveying a pallet that has boxes thereon to a pallet location defined by a platform lift, wherein the platform lift is operable to be raised and lowered while supporting one or more workers; transferring the boxes from the pallet to a transfer conveyor; conveying the boxes along the transfer conveyor and onto a box discharge conveyor by which the boxes are transported away from the pallet location; and lowering the platform lift to reduce lifting of the boxes by the one or more workers during the transferring, wherein the box discharge conveyor and the transfer conveyor lower in coordination with the platform lift as the platform lift is lowered.

Such a depalletization method may optionally include one or more of the following features. The transfer conveyor may extend in a cantilevered arrangement toward the pallet location. The transfer conveyor may comprise an output end adjacent the box discharge conveyor and input end that is opposite of the output end and that is a free end. The method may also include pivoting the transfer conveyor relative to the box discharge conveyor such that the input end is moved upward and downward along an arcuate path. The method may also include extending the transfer conveyor to increase a length of the transfer conveyor between the input and output ends. The method may also include retracting the transfer conveyor to decrease the length of the transfer conveyor between the input and output ends. The platform lift may comprise a U-shaped platform. The U-shaped platform may surround the pallet location on exactly three sides. The method may also include, after all of the boxes have been transferred from the pallet, using an empty pallet handling system comprising a pallet lifting device to move the pallet from the pallet location to an empty pallet conveyance means that is arranged and operable to convey the pallet away from the depalletization system. The method may also include moving the transfer conveyor along the box discharge conveyor and away from the pallet location.

The systems and processes described here may be used to provide one or more of the following optional benefits. First, worker safety enhancements are provided by the systems and processes described herein. The need for manual, physical lifting is reduced. In addition, the manual tasks that workers need to perform for depalletization or pallet downstacking are made more ergonomically friendly by the systems and processes described herein. For example, the need for waist rotation by the workers is reduced. Moreover, the U-shaped platforms described herein allow for two workers to work together to handle large or heavy boxes (rather than making a single worker handle such boxes alone). In addition, the depalletization systems described herein reduce the need for direct interactions between workers and powered material handling equipment, thereby enhancing worker safety. Accordingly, for at least these reasons, the risks for worker injuries is reduced using the systems and methods described herein.

Second, labor costs associated with depalletization processes can be reduced using the depalletization systems and processes described herein. Injuries are reduced. Productivity and throughput is improved (in comparison to other known depalletization systems and methods). That is, each worker can handle more boxes per hour using the systems and processes described herein. Moreover, in some cases fewer workers may be required because manual tasks are reduced using the systems and processes described herein.

Third, in some cases overall warehouse space requirements can be reduced using the automated systems and processes described herein.

Other features, aspects and potential advantages will be apparent from the accompanying description and figures.

DESCRIPTION OF DRAWINGS

Like reference symbols in the various drawings indicate like elements.

DETAILED DESCRIPTION

This document describes systems and methods for enhancing warehouse material handling operations. For example, this document describes automation systems and methods that make depalletization processes more safe and efficient. In some examples, the depalletization systems described herein include a U-shaped platform lift that supports one or more workers and that defines a location for a pallet of boxes to be unloaded or "depalletized." The U-shaped platform lift can be raised and/or lowered to position the workers at the optimal elevations for transferring, with minimal lifting, the boxes from the pallet to a system of conveyors. As described below, the system of conveyors is also reconfigurable in multiple ways to further minimize the manual lifting required for the depalletization process.

Figure 1:
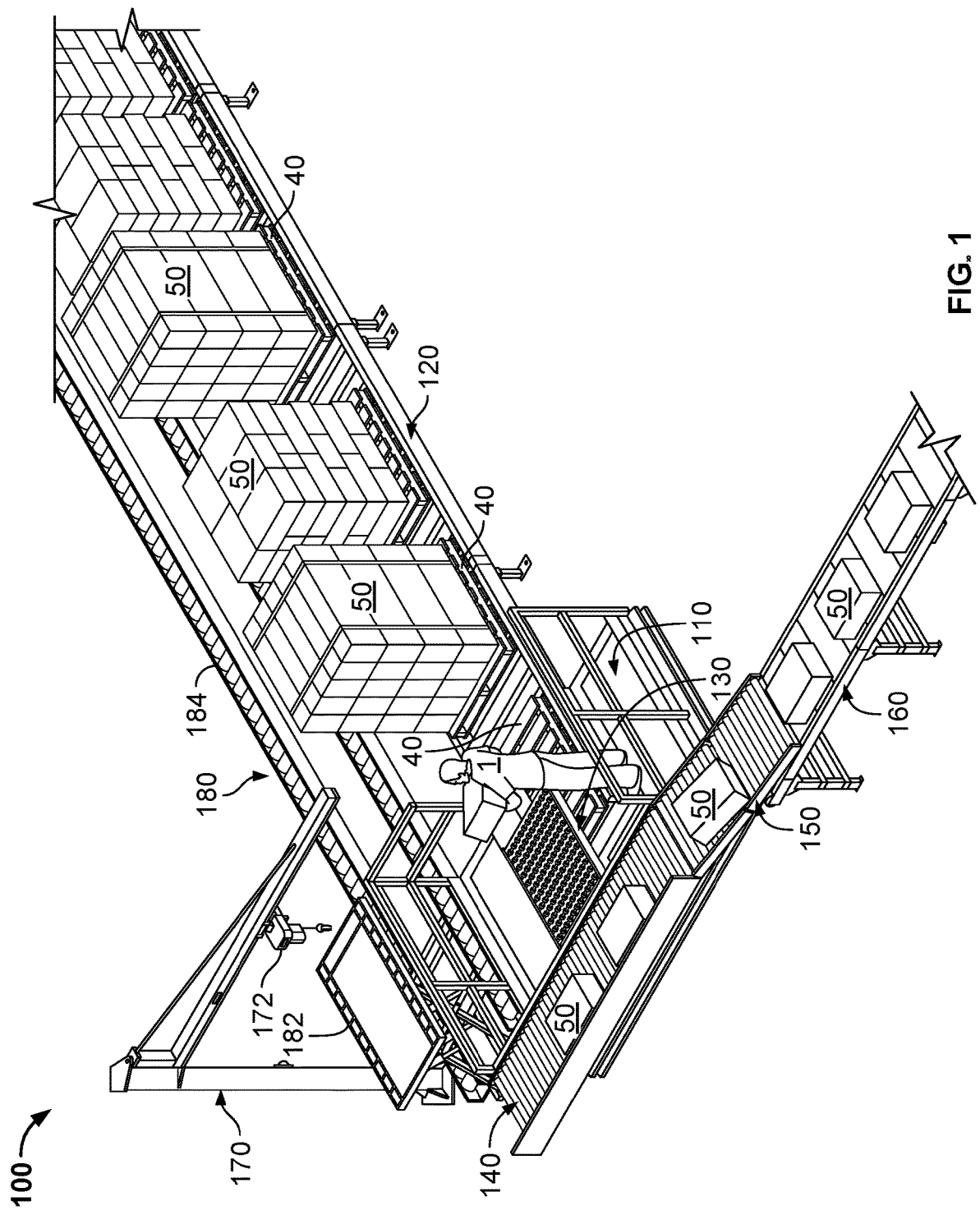
FIG. 1 depicts an example warehouse depalletization system in accordance with some embodiments. The depalletization system includes, for example, a U-shaped platform lift that defines a pallet location.

FIG. 1 depicts an example depalletization system 100. The purpose of the depalletization system 100 is to facilitate "breaking down," unloading, or depalletization of pallet loads of boxes (or other items/units) into individual boxes (or other items/units). Such a depalletization system 100 can be useful in multiple contexts. For example, in some cases the depalletization system 100 can be used at a warehouse where incoming pallet loads of boxes need to be broken down into individual boxes for various purposes such as, but not limited to, for distributing the boxes to multiple shipping vehicles, or for distributing the boxes to storage, or to order sortation systems, or to transport vehicles, and the like.

In some cases, the depalletization system 100 can be advantageously used at various other types of facilities in addition to warehouses including, but not limited to, retail stores, order fulfillment centers, distribution centers, flow centers, inventory storing locations, receive centers, cross-docking facilities, material handling facilities, and the like, and combinations thereof. In this disclosure, the term "warehouse" is used to refer to any and all such different types of facilities, and combinations thereof.

In the depicted embodiment, the depalletization system 100 includes a platform lift 110, a pallet conveyance means 120, a transfer conveyor 130, a box discharge conveyor 140, a transition conveyor 150, a takeaway conveyor 160, an empty pallet handling system 170, and an empty pallet conveyance means 180 (optionally including a pallet lift 182, as described further below). In some embodiments of the depalletization system 100, one or more of the aforementioned portions of the depalletization system 100 may not be required or may be configured differently than illustrated.

At a high level, the depalletization system 100 functions as follows. The pallets 40 that are loaded with boxes 50 are transported toward the platform lift 110 by the pallet conveyance means 120. In particular, the pallet conveyance means 120 transports the pallets 40 that are loaded with boxes 50 to a designated pallet location 122 (see FIG. 6) that is defined by the platform lift 110. At the pallet location 122, one or more workers 1 transfer each of the boxes 50 from the pallet 40 to the transfer conveyor 130. The boxes 50 are transported by the transfer conveyor 130 to the box discharge conveyor 140. Once the boxes 50 are on the box discharge conveyor 140, the boxes 50 are then transported to the transition conveyor 150. The boxes 50 travel along the transition conveyor 150 and onto the takeaway conveyor 160. The takeaway conveyor 160 transports the boxes 50 to another location away from the depalletization system 100.

When the pallet 40 at the pallet location 122 (see FIG. 6) has had all of its boxes 50 removed, the empty pallet handling system 170 can be used by the worker 1 to move the empty pallet 40 from the pallet location 122 to the empty pallet conveyance means 180. The empty pallet conveyance means 180 can transport one or more empty pallets 40 away from the depalletization system 100. In addition, when the pallet 40 at the pallet location 122 has been moved out of the pallet location 122, the next pallet 40 with boxes 50 thereon can be moved by the pallet conveyance means 120 to the pallet location 122 for depalletization by the one or more workers 1. The above process steps can be repeated over and over again to continue the depalletization process of the boxes 50 from the pallets 40.

The depalletization system 100 advantageously functions to allow the physical work (e.g., lifting, twisting, carrying, etc.) performed by the one or more workers 1 to be less physically strenuous and more ergonomically-friendly than conventional depalletization processes. The depalletization system 100 is also configured to make the workers 1 highly productive during depalletization, increasing the throughput of the depalletization process.

One of the multiple ways that the depalletization system 100 makes the physical work performed by the one or more workers 1 less physically strenuous and more ergonomically-friendly relates to the fact that the platform lift 110 is operable to be raised and/or lowered while the one or more workers 1 are standing on the platform lift 110. This is beneficial for at least the following reasons. First, it should be observed that the incoming pallet loads have multiple boxes 50 arranged in multiple layers on the pallet 40. That is, in most cases each layer of boxes 50 includes multiple boxes 50, and there are multiple layers of the boxes 50 on the pallet 40. The top level of boxes 50 is much higher (e.g., six feet or more in some cases) than the bottom level of the boxes 50. This substantial difference in height of the levels of the boxes 50 would ordinarily cause the workers 1 to need to reach up to the top levels and to bend down to the lower levels during depalletization. Such an arrangement is physically strenuous and not ergonomically-friendly for the workers 1.

To mitigate the physical and ergonomic issues described immediately above, the platform lift 110 of the depalletization system 100 can be raised and lowered so that the top layer of boxes 50 of the pallet 40 being depalletized is approximately at the same elevation as the transfer conveyor 130. That way, the worker(s) 1 can transfer the boxes 50 from the top layer of boxes 50 to the transfer conveyor 130 without much, if any, lifting of the boxes 50. In addition, the transfer conveyor 130 can be raised (pivoted upward) to allow for the workers 1 to position themselves on either side of the pallet 40 being unloaded. This also substantially enhances worker ergonomics by reducing the need for reaching. When all of the boxes 50 of the top layer have been transferred by the worker(s) 1 to the transfer conveyor 130, the platform lift 110 (and the transfer conveyor 130) can be lowered by a distance equal to the height of a layer of the boxes 50 so that the new top layer of the boxes 50 becomes at approximately at the same elevation as the transfer conveyor 130.

Hence, because the platform lift 110 (and the transfer conveyor 130) can be raised and lowered as described above, the depalletization process is made less physically strenuous for the worker(s) 1, and the ergonomics of the depalletization process are enhanced. In addition, the depalletization system 100 includes other features that make the depalletization process less physically strenuous and more ergonomically friendly, as described further below.

The depalletization system 100 includes the pallet conveyance means 120. The pallet conveyance means 120 is used to convey pallets 40 that are loaded with boxes 50 to the pallet location 122 (FIG. 6) that is defined by the platform lift 110. In the depicted embodiment, the pallet conveyance means 120 is a roller conveyor. Such a roller conveyor can be gravity fed, powered, and combinations thereof. The pallet conveyance means 120 can be various other types of conveyors such as, but not limited to, a roller ball conveyor, belt conveyor, an automated storage and retrieval system (ASRS) conveyor, and the like. In some embodiments, the pallet conveyance means 120 can be other types of mechanisms including, but not limited to, robotic pallet transporters, manual pallet jacks, powered pallet jacks, forklifts, walkie pallet stackers, and the like. In sum, any kind of pallet mover can be used for the pallet conveyance means 120.

The depalletization system 100 also includes the platform lift 110. The platform lift 110 is operable to be raised and lowered while supporting one or more workers 1. The platform lift 110 defines a pallet location 122 (FIG. 6) where the one or more workers 1 can remove boxes 50 from a pallet 40 while standing on the platform lift 110. The raising and/or lowering of the platform lift 110 can be hydraulically powered, electrically powered, and the like.

In some embodiments, the raising and/or lowering of the platform lift 110 is manually controlled by the worker(s) 1 (e.g., using manual controls). In some embodiments, the raising and/or lowering of the platform lift 110 is automated in correspondence with the depalletization of a full layer of the boxes 50 (e.g., using optical or ultrasonic sensors to determine when the full layer of the boxes 50 has been removed.

In the depicted embodiment, the platform lift 110 comprises a U-shaped platform. The pallet location 122 (FIG. 6) is defined by the platform lift 110 within the U-shape. Accordingly, the pallet location 122 is surrounded by the platform lift 110 on exactly three sides. The platform lift 110 can include guard rails, toe kicks, bellows, light curtains, safety switches, and other structural and/or electromechanical features.

The depalletization system 100 also includes the transfer conveyor 130. In the depicted embodiment, the transfer conveyor 130 is a roller ball conveyor. However, in some embodiments the transfer conveyor 130 can be a roller conveyor, a belt conveyor, or other types of conveyors. The transfer conveyor 130 can be powered or manually operated (e.g., by gravity or by pushing by the worker(s) 1).

Figure 6:
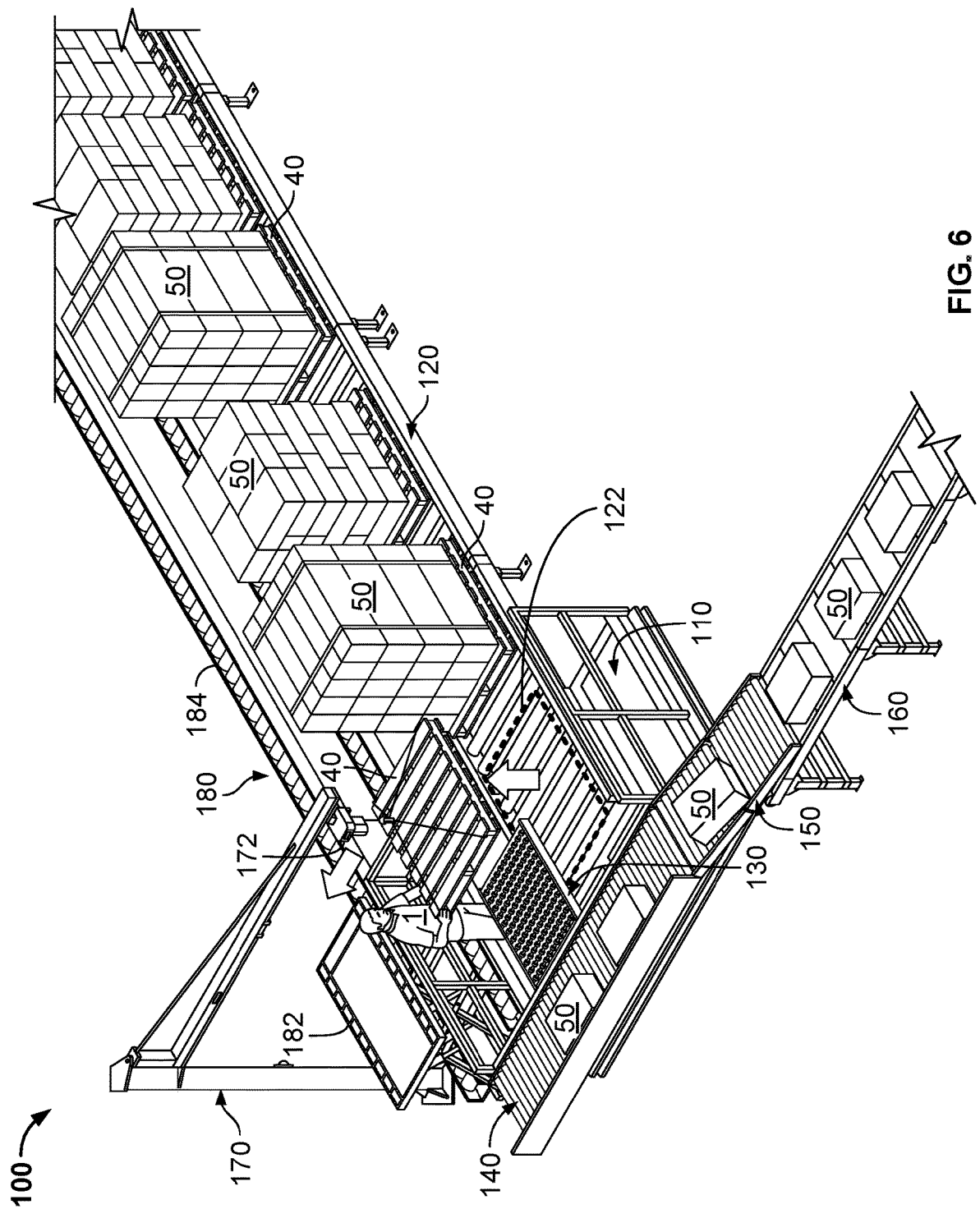
FIGS. 6 and 7 depict the warehouse depalletization system of FIG. 1 being used to remove an empty pallet from the pallet location (after all boxes have been unloaded from the pallet).

The transfer conveyor 130 extends between the box discharge conveyor 140 and the pallet location 122 (FIG. 6). In the depicted embodiment, the transfer conveyor 130 extends in a cantilevered arrangement toward the pallet location 122. The transfer conveyor 130 comprises an output end adjacent the box discharge conveyor 140 and input end that is adjustably adjacent to the pallet location 122. The input end of the transfer conveyor 130 is opposite of the output end and is a free end. That is, in the depicted embodiment the transfer conveyor 130 is cantilevered and the free end of the cantilever is the input end (adjustably adjacent to the pallet location 122).

The transfer conveyor 130 has many unique features and degrees of freedom by which the position and/or configuration of the transfer conveyor 130 can be adjusted by the worker(s) 1 to facilitate the depalletization process. For example, the transfer conveyor 130 is extendable and retractable. This means that the transfer conveyor 130 can be made longer or shorter. The adjustability of the length of the transfer conveyor 130 can be visualized by comparing FIG. 4 to FIG. 5, and by comparing FIG. 5 to FIG. 6. In FIG. 5, the length of the transfer conveyor 130 is longer than in FIGS. 4 and 6. In some embodiments, the worker(s) 1 can manually adjust the length of the transfer conveyor 130. In some embodiments, the length of the transfer conveyor 130 can be adjusted in a powered manner.

The transfer conveyor 130 is also pivotable relative to the box discharge conveyor 140. This is pivotable functionality of the transfer conveyor 130 is visible in FIG. 2. As the transfer conveyor 130 is pivoted relative to the box discharge conveyor 140, the input end of the transfer conveyor 130 is moved upward or downward along an arcuate path.

The transfer conveyor 130 is also movable (e.g., translatable) along the box discharge conveyor 140. This functionality of the transfer conveyor 130 can be visualized, for example, by comparing the position of the transfer conveyor 130 in FIG. 2 in comparison the position of the transfer conveyor 130 in FIG. 9.

The depalletization system 100 also includes the box discharge conveyor 140. The box discharge conveyor 140 is arranged and operable to convey the boxes 50 away from the platform lift 110. In the depicted embodiment, the box discharge conveyor 140 is a roller conveyor. In some embodiments, the box discharge conveyor 140 can be any other suitable type of conveyor including, but not limited to, a belt conveyor, a roller ball conveyor, an extendable conveyor, and so on. The box discharge conveyor 140 can be arranged to convey the boxes 50 away from the depalletization system 100 in any desired direction (e.g., perpendicular to the pallet conveyance means 120 (as shown), parallel to the pallet conveyance means 120, at an acute angle to the pallet conveyance means 120, etc.).

In the depicted embodiment of the depalletization system 100, the box discharge conveyor 140 and the transfer conveyor 130 raise and lower in coordination with the platform lift 110 as the platform lift 110 is raised and lowered. That is, when the platform lift 110 is raised, the discharge conveyor 140 and the transfer conveyor 130 raise right along with the platform lift 110. Conversely, when the platform lift 110 is lowered, the discharge conveyor 140 and the transfer conveyor 130 lower right along with the platform lift 110. That way, the elevation of the transfer conveyor 130 and the discharge conveyor 140 can be adjusted to be approximately equal to the elevation of the uppermost level of boxes 50 on the pallet 40 in the pallet location 122 (FIG. 6).

The depalletization system 100 also includes the transition conveyor 150. The transition conveyor 150 extends between the box discharge conveyor 140 and the takeaway conveyor 160. In the depicted embodiment, a first end (input end) of the transition conveyor 150 is pivotably coupled to an output end of the discharge conveyor 140. A second end (output end) of the transition conveyor 150 is slidably coupled to the takeaway conveyor 160. Accordingly, as the discharge conveyor 140 is raised or lowered in coordination with the platform lift 110, the first end (input end) of the transition conveyor 150 is also raised or lowered in coordination with the platform lift 110. However, the elevation of the second end (output end) of the transition conveyor 150 does not change as the discharge conveyor 140 is raised or lowered in coordination with the platform lift 110. This means that the incline angle of the transition conveyor 150 changes as the discharge conveyor 140 is raised or lowered in coordination with the platform lift 110. The incline angle of the transition conveyor 150 becomes steeper as the discharge conveyor 140 is raised in coordination with the platform lift 110. Conversely, the incline angle of the transition conveyor 150 becomes less steep (more towards horizontal) as the discharge conveyor 140 is lowered in coordination with the platform lift 110.

The depalletization system 100 also includes the takeaway conveyor 160 that transports the boxes 50 away from the depalletization system 100 and to the next process location.

The depalletization system 100 also optionally includes the empty pallet handling system 170. The empty pallet handling system 170 includes a hoist 172. In the depicted embodiment the hoist 172 is a jib crane, but another suitable type of hoist can be used for the empty pallet handling system 170. The hoist can be used to lift an empty pallet 40 from the pallet location 122 (FIG. 6), and to move it to the empty pallet conveyance means 180. The empty pallet conveyance means 180 is arranged and operable to convey empty pallets 40 away from the depalletization system 100.

In the depicted embodiment, the empty pallet conveyance means 180 includes an optional scissors lift 182 and a conveyor 184. The worker 1 can use the hoist 172 to move the empty pallet to the scissors lift 182, and then the conveyor 184 can transport one or more of the pallets 40 away from the depalletization system 100.

Now that the basic structures and functionalities of the sub-systems and devices of the depalletization system 100 have been described, the methods or processes for using the depalletization system 100 will be described in reference to the sequential illustrations of FIGS. 1-8.

In FIG. 1, the worker 1 is transferring to the transfer conveyor 130 a box 50 from the lowest layer of boxes 50 on the pallet 40 in the pallet location 122 (FIG. 6). The platform lift 110, the transfer conveyor 130, the box discharge conveyor 140, and the transition conveyor 150 are jointly arranged at a low elevation in this configuration, so that the transfer conveyor 130 is near to the elevation of the boxes 50 on the pallet 40. This minimizes the extent of lifting that the worker 1 needs to execute in order to move the boxes 50 from the lowest level of the pallet 40 to the transfer conveyor 130.

It can also be seen in FIG. 1 (and subsequent FIGS. 2-8) that other boxes 50 that the worker 1 has already unloaded from the pallet 40 are being transported along the box discharge conveyor 140, the transition conveyor 150, and the takeaway conveyor 160. Moreover, additional pallets 40 that are stacked with boxes 50 are staged and awaiting depalletization on the pallet conveyance means 120. Those will eventually move toward the pallet location 122 to be depalletized by the worker 1.

Figure 2:
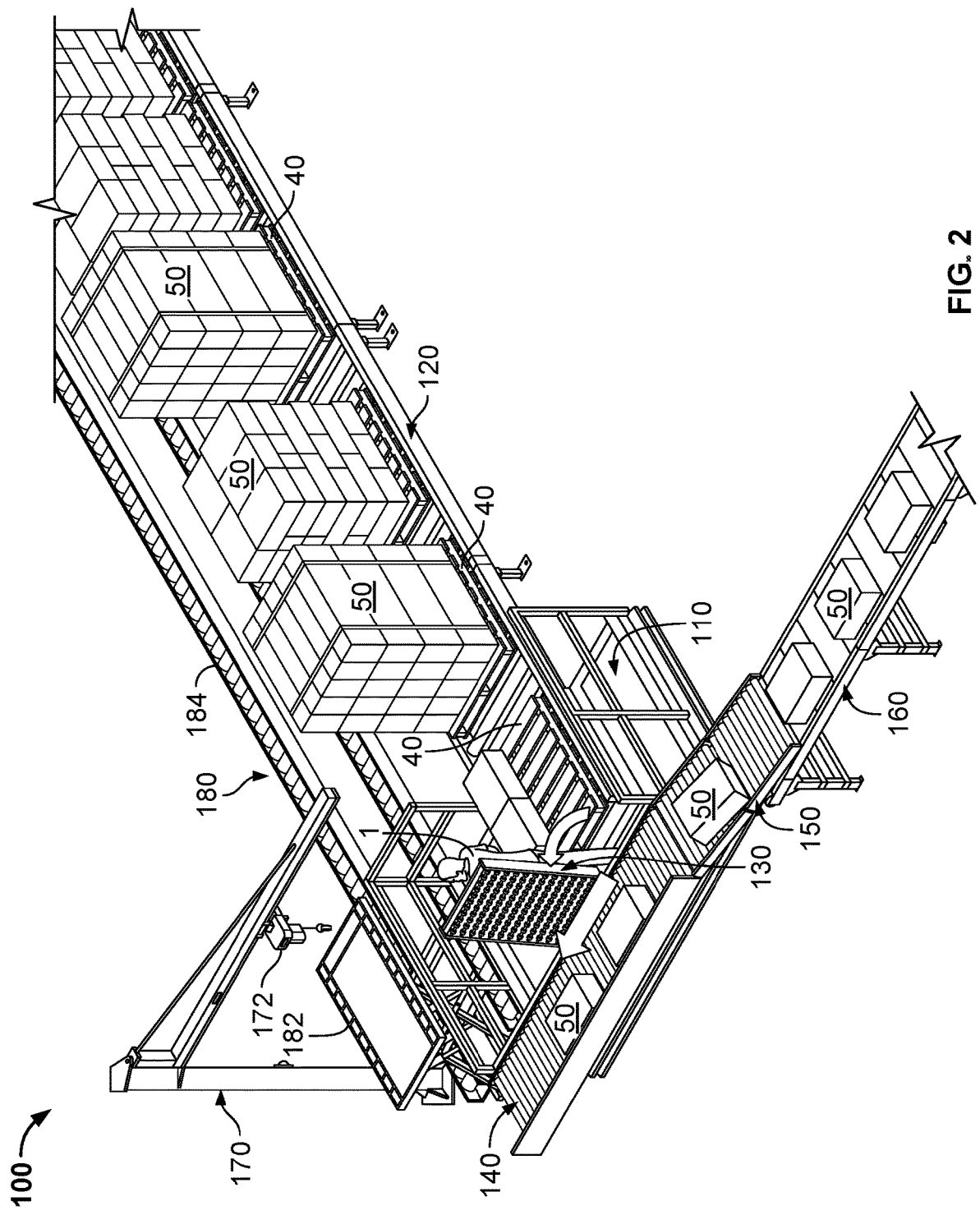
FIG. 2 depicts some additional operational features of the warehouse depalletization system of FIG. 1, such as how the transfer conveyor can be raised to allow for one or more workers to be on either side of the pallet being unloaded.

In FIG. 2, the worker 1 has pivoted the transfer conveyor 130 upward so that the worker 1 can walk to the other side of the pallet 40 to be in close proximity to unload the last boxes 50 that are on the other side of the pallet 40.

Figure 3:
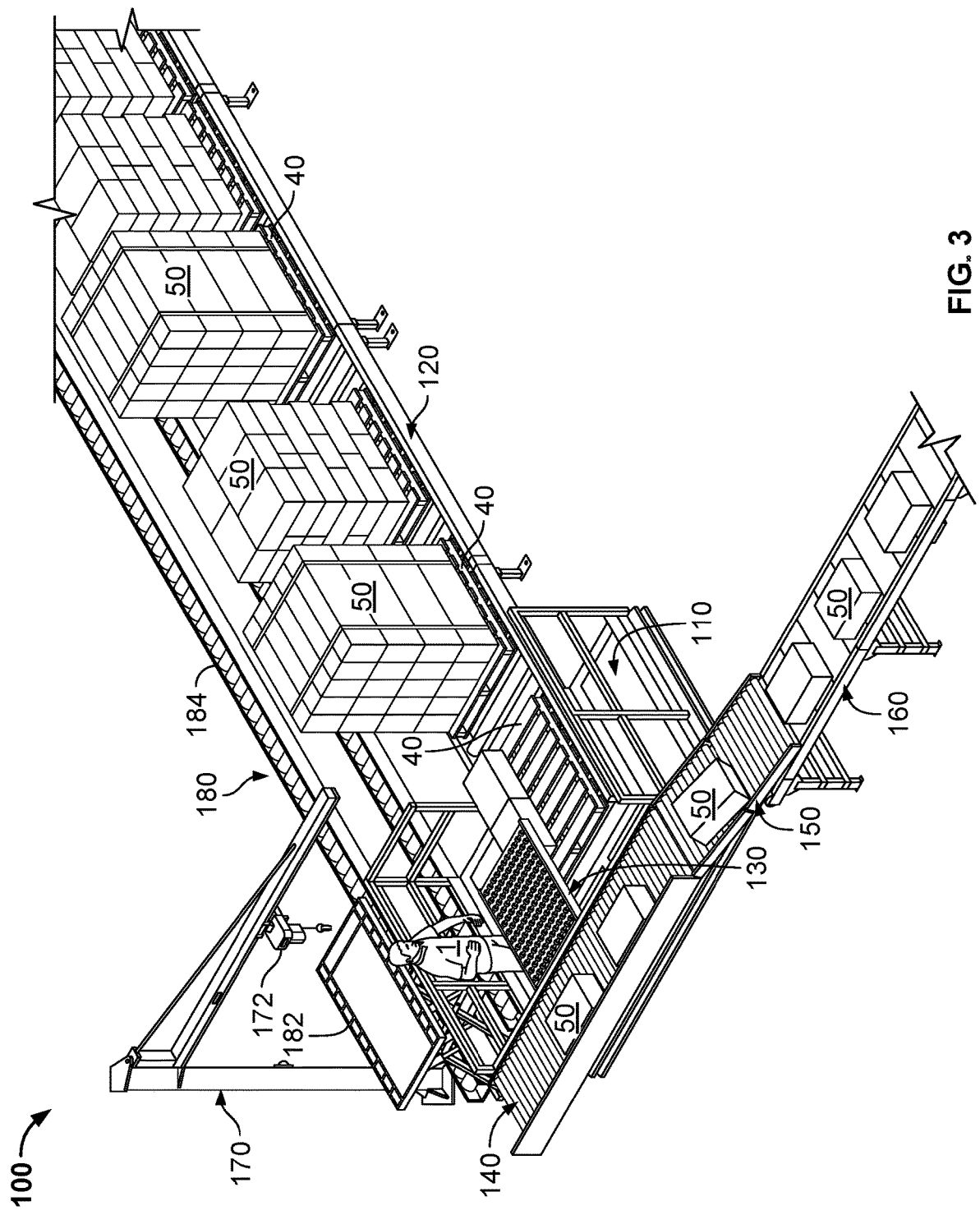
FIGS. 3-5 depict the warehouse depalletization system of FIG. 1 being used to fully unload a pallet of boxes while the pallet is positioned in the pallet location defined by the U-shaped platform lift, including how the transfer conveyor can be extended to minimize the need for workers to lift and carry boxes.

In FIG. 3, the worker 1 has pivoted the transfer conveyor 130 downward to its horizontal operative position in which it is ready to receive the boxes 50.

Figure 4:
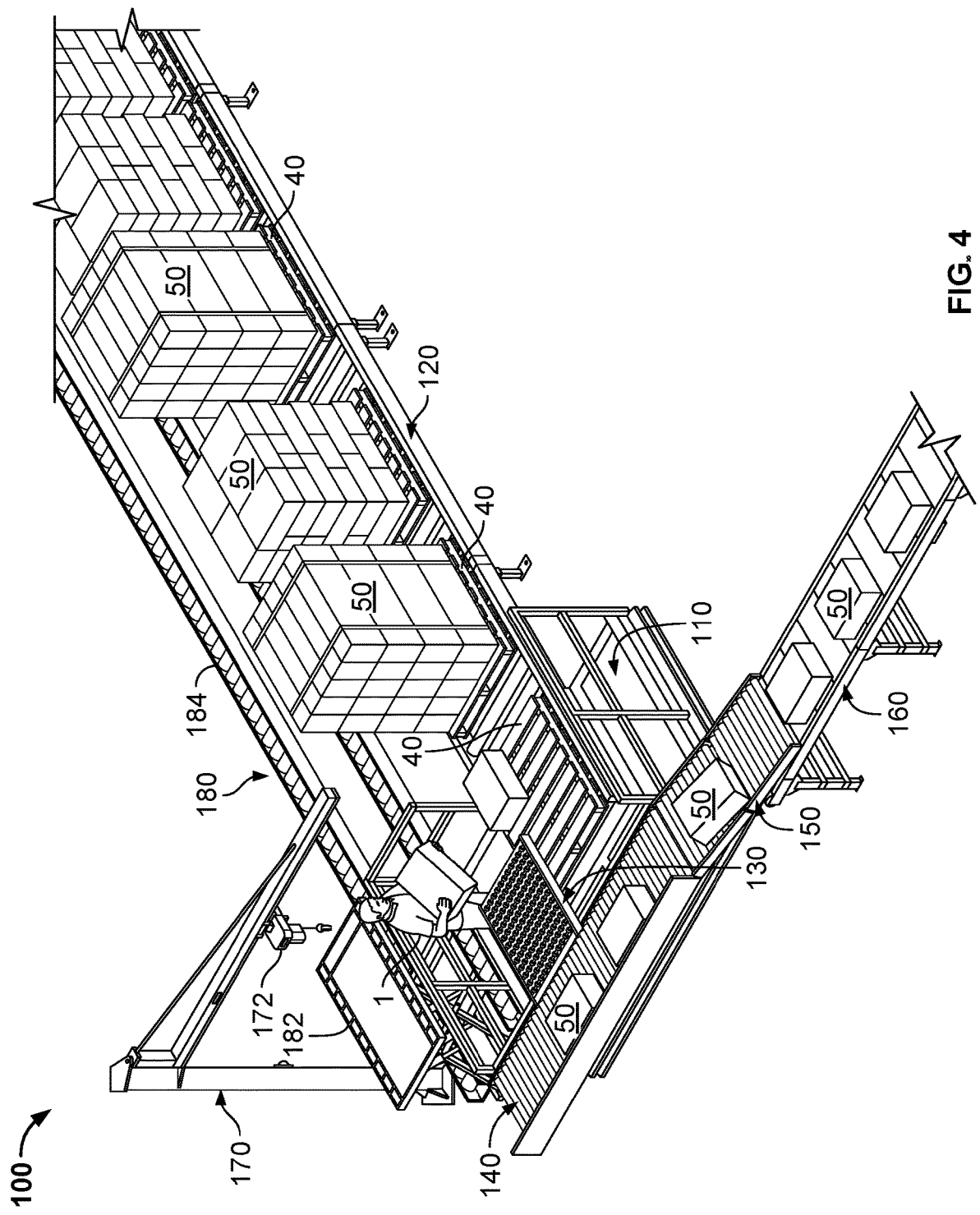
Figure 5:
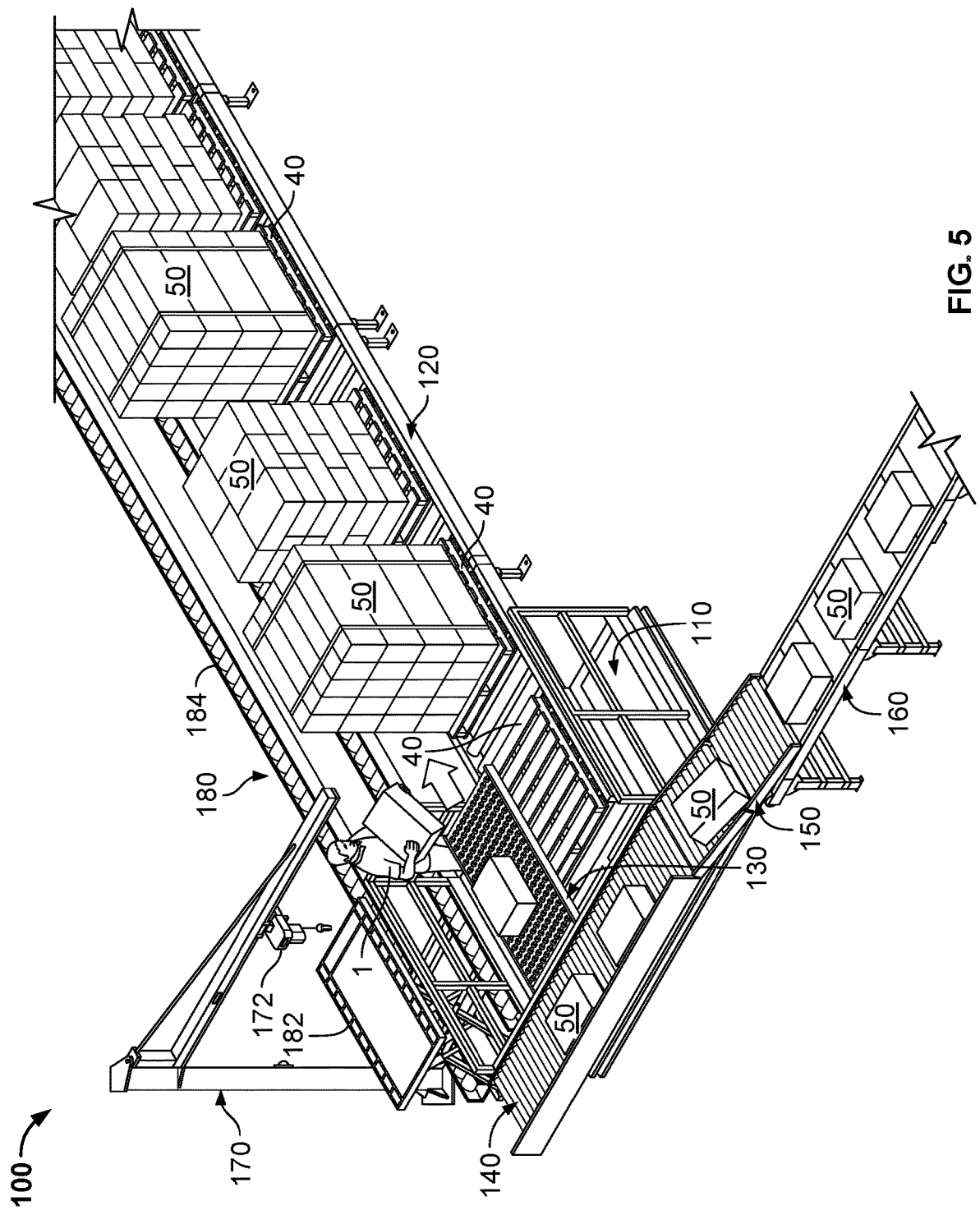

In FIG. 4, the worker 1 is transferring the second to last box 50 from the pallet 40 to the transfer conveyor 130.

In FIG. 5, the worker 1 is transferring the last box 50 from the pallet 40 to the transfer conveyor 130. The pallet 40 is now empty of boxes 50.

Figure 7:
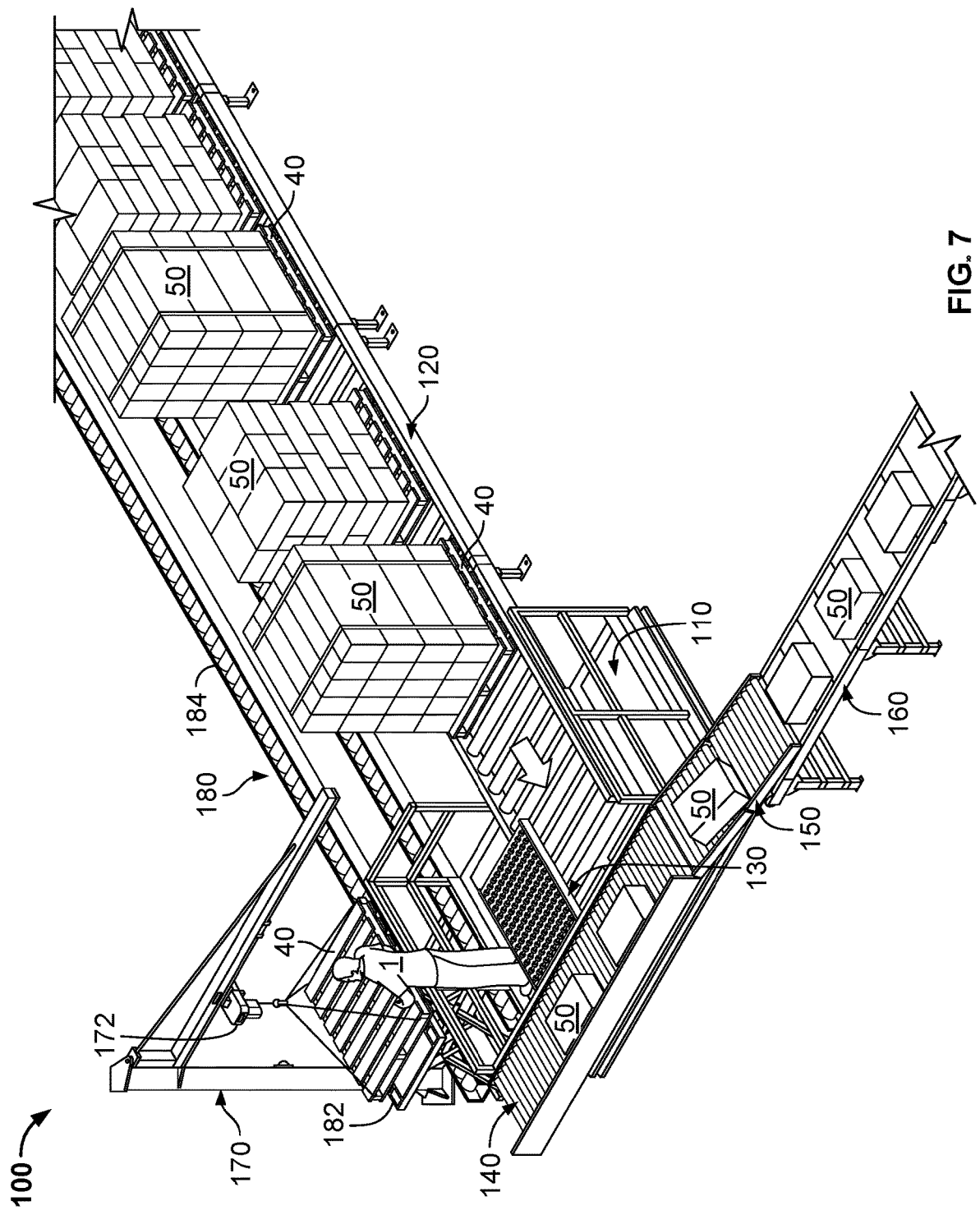

In FIGS. 6 and 7, the worker 1 is using the empty pallet handling system 170 to move the empty pallet 40 from the pallet location 122 to the empty pallet conveyance means 180. In FIG. 7, the next pallet 40 of boxes 50 is starting to move toward the pallet location 122 to be depalletized by the worker 1.

Figure 8:
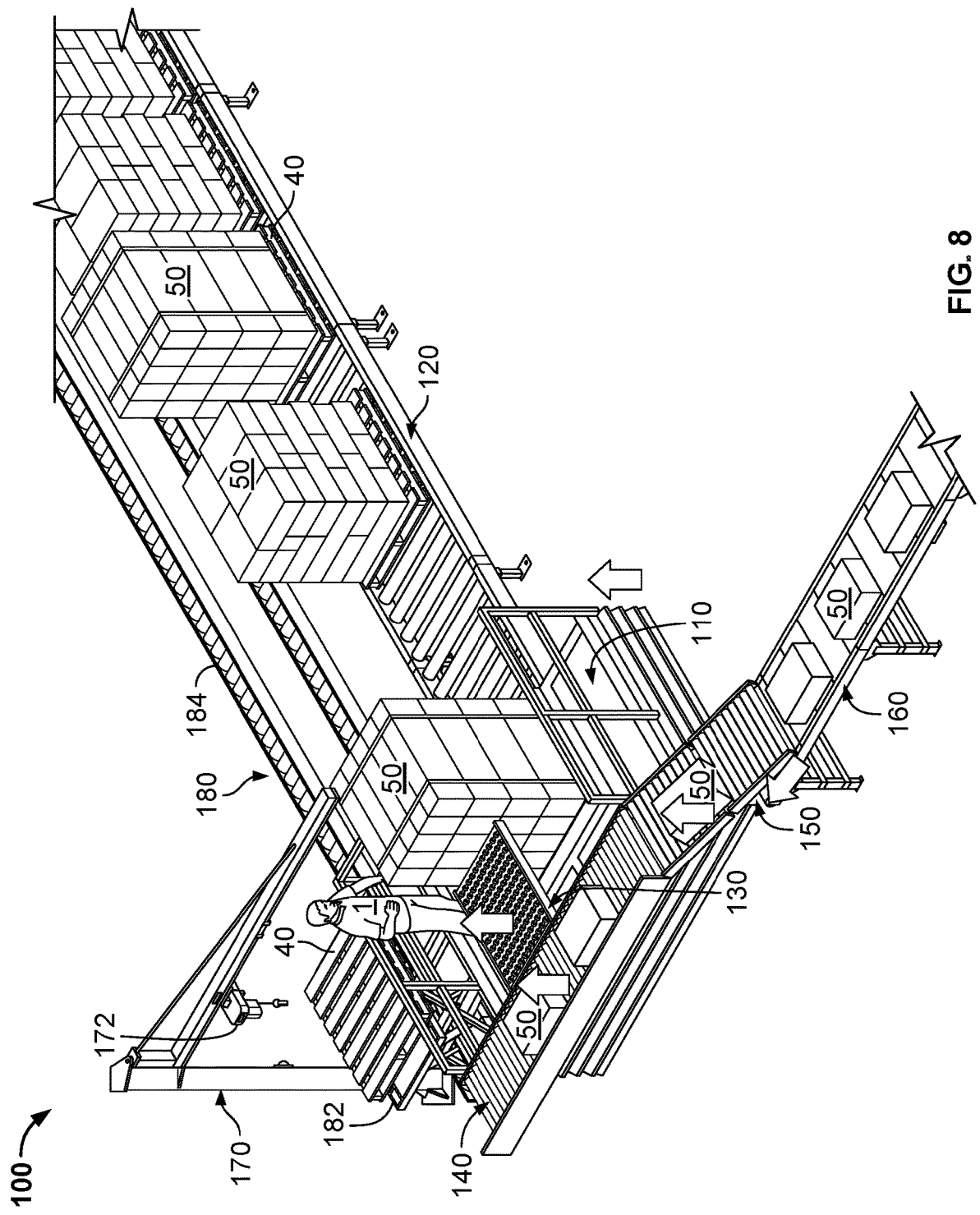
FIG. 8 depicts the warehouse depalletization system of FIG. 1 with a second pallet of boxes positioned in the pallet location and shows how the platform lift can be raised to enhance worker ergonomics when unloading a tall pallet load.

In FIG. 8, the next pallet 40 of boxes 50 has moved to the pallet location 122 to be depalletized by the worker 1. In addition, the platform lift 110, the transfer conveyor 130, the box discharge conveyor 140, and the transition conveyor 150 have been jointly raised (compare to FIGS. 1-7) to a high elevation so that the transfer conveyor 130 is near to the elevation of the top layer boxes 50 on the pallet 40. This will reduce the extent of lifting/carrying required by the worker 1 to move the upper layers of the boxes 50 to the transfer conveyor 130.

As the depalletization process progresses, the elevation of the platform lift 110, the transfer conveyor 130, the box discharge conveyor 140, and the transition conveyor 150 can be lowered (as desired) to continue minimizing the extent of lifting/carrying required by the worker 1 to move the boxes 50 to the transfer conveyor 130.

Figure 9:
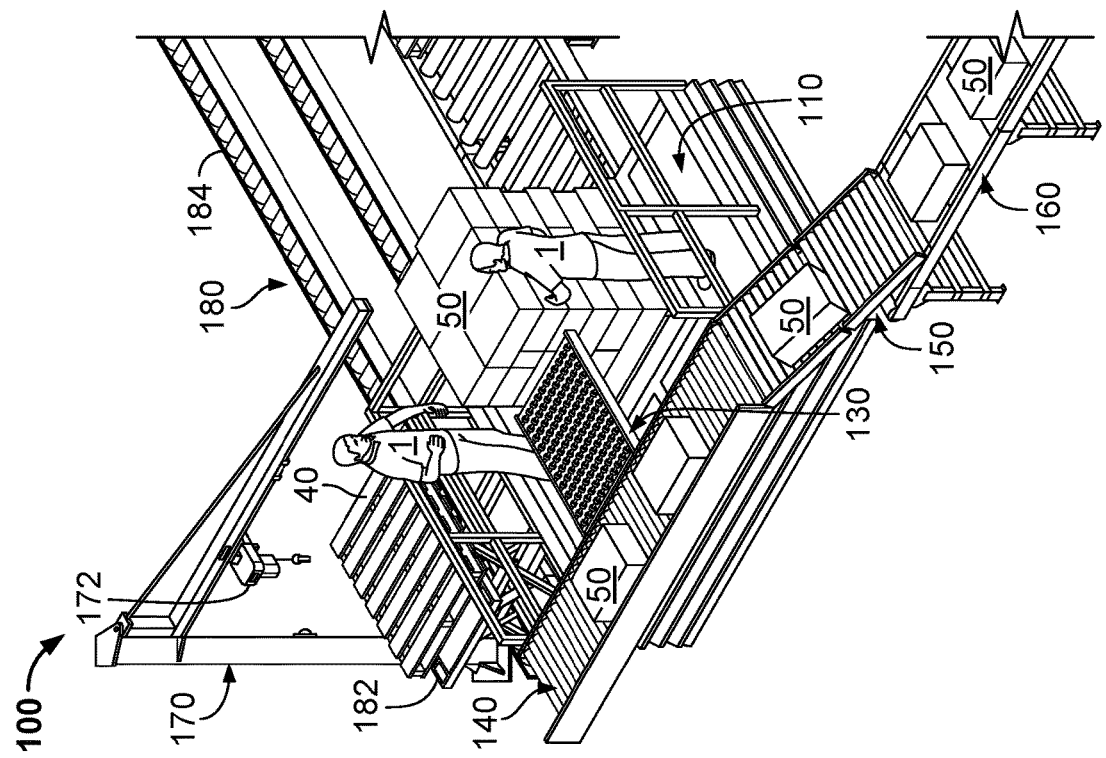

FIG. 9 illustrates how the depalletization system 100 can facilitate cooperation between two workers 1 to depalletized large, awkward, or heavy boxes from the pallet 40. In this depicted example, the transfer conveyor 130 has been pivoted upward and moved (linearly translated, slid, etc.) along the box discharge conveyor 140 to move it out of the way while the two workers 1 are moving the large box 50 directly to the box discharge conveyor 140. This illustrates some of the flexibility of the depalletization system 100 and some of the advantages of the depicted U-shape of the platform lift 110 (in that is accommodates at least two workers 1).

Figure 10:
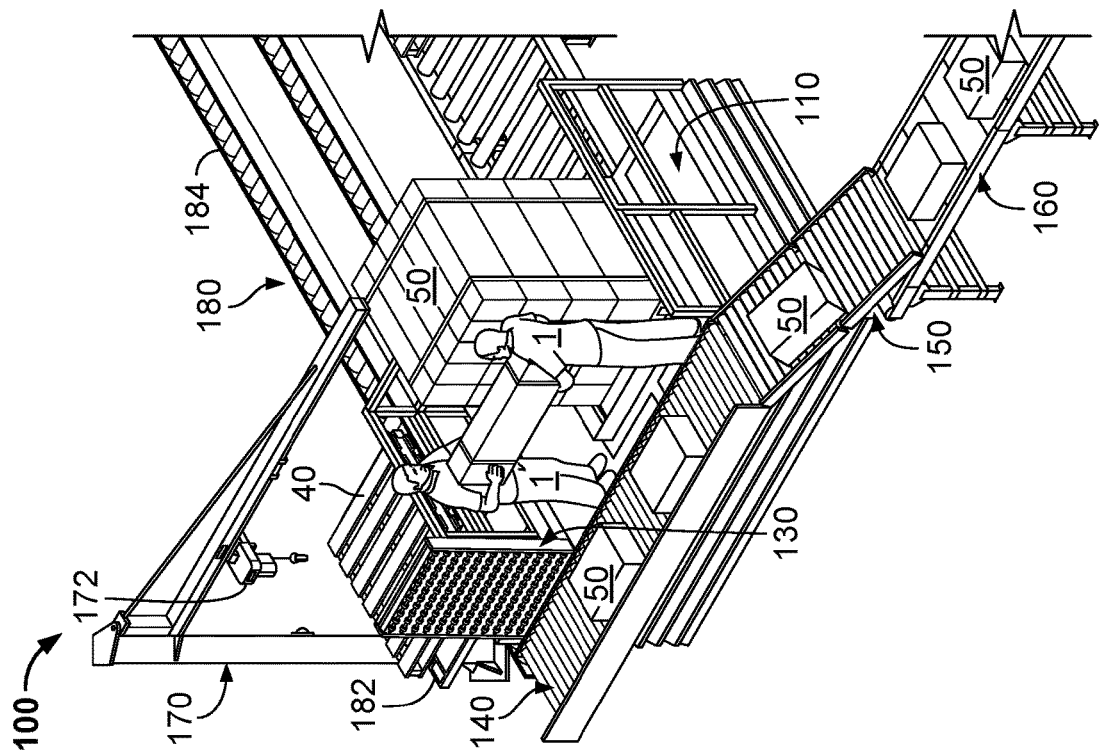
FIGS. 9 and 10 illustrate how two workers can perform depalletization tasks at the same time using the warehouse depalletization system of FIG. 1.

FIG. 10 illustrates another way that the depalletization system 100 can facilitate cooperation between two workers 1 to unload a pallet 40. In this example, a worker 1 is on each side of the pallet 40 so that the boxes 50 can be moved to the transfer conveyor 130 at a high rate of speed (by virtue of having two workers 1 depalletizing at the same time). This way the throughput of the depalletization process using the depalletization system 100 can be greatly enhanced (as compared to having a single worker 1 performing the depalletization).

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Various implementations of the systems and techniques described here can be realized at least partially in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, a trackball, or a touchscreen, etc.) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, tactile input, eye movement tracking input, a brain-computer interface, gesture input, and the like, and combinations thereof).

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

What is claimed is:

1. A depalletization system comprising:
a platform lift that is operable to be raised and lowered while supporting one or more workers, the platform lift defining a pallet location where the one or more workers can remove boxes from a pallet while standing on the platform lift;
a box discharge conveyor arranged and operable to convey the boxes away from the platform lift;
a transfer conveyor extending between the box discharge conveyor and the pallet location, the transfer conveyor comprising an output end adjacent the box discharge conveyor and an input end that is opposite of the output end and that is a free end;
a transition conveyor having an input end that is pivotably coupled to an output end of the box discharge conveyor; and
a takeaway conveyor arranged for conveying the boxes away from the depalletization system,
wherein an output end of the transition conveyor is slidably coupled to the takeaway conveyor,
wherein the transfer conveyor is pivotable relative to the box discharge conveyor such that the input end is movable upward and downward along an arcuate path,
wherein the transfer conveyor is translatable along the box discharge conveyor,
wherein the box discharge conveyor and the transfer conveyor raise and lower in coordination with the platform lift as the platform lift is raised and lowered, and
wherein an incline angle of the transition conveyor changes as the platform lift is raised and lowered.

2. The depalletization system of claim 1, further comprising a pallet conveyance means that is arranged and operable to convey the pallet to the pallet location.

3. The depalletization system of claim 1, wherein the transfer conveyor extends in a cantilevered arrangement toward the pallet location.

4. The depalletization system of claim 1, wherein the transfer conveyor is: (i) extendable to increase a length of the transfer conveyor between the input and output ends and (ii) retractable to decrease the length of the transfer conveyor between the input and output ends.

5. The depalletization system of claim 1, wherein the platform lift comprises a U-shaped platform.

6. The depalletization system of claim 5, wherein the U-shaped platform surrounds the pallet location on exactly three sides.

7. The depalletization system of claim 1, further comprising an empty pallet handling system comprising a pallet lifting device.

8. The depalletization system of claim 7, wherein the pallet lifting device is arranged and operable to move an empty pallet from the pallet location to an empty pallet conveyance means that is arranged and operable to convey the empty pallet away from the depalletization system.

9. A depalletization method comprising:
conveying a pallet that has boxes thereon to a pallet location defined by a platform lift, wherein the platform lift is operable to be raised and lowered while supporting one or more workers;
transferring the boxes from the pallet to a transfer conveyor, wherein the transfer conveyor comprises: an output end adjacent a box discharge conveyor and an input end that is opposite of the output end and that is a free end, wherein the transfer conveyor is pivotable relative to the box discharge conveyor such that the input end is movable upward and downward along an arcuate path, and wherein the transfer conveyor is translatable along the box discharge conveyor;

conveying the boxes along the transfer conveyor and onto the box discharge conveyor;

conveying the boxes along the box discharge conveyor and onto a transition conveyor by which the boxes are transported away from the pallet location, wherein the transfer conveyor has an input end that is pivotably coupled to an output end of the box discharge conveyor;

translating the transfer conveyor along the box discharge conveyor;

lowering the platform lift to reduce lifting of the boxes by the one or more workers during the transferring, wherein the box discharge conveyor and the transfer conveyor lower in coordination with the platform lift as the platform lift is lowered, and wherein an incline angle of the transition conveyor changes as the platform lift is lowered; and conveying the boxes along the transition conveyor to a takeaway conveyor arranged for conveying the boxes away from the depalletization system, wherein an output end of the transition conveyor is slidably coupled to the takeaway conveyor.

10. The method of claim 9, wherein the transfer conveyor extends in a cantilevered arrangement toward the pallet location.

11. The method of claim 9, further comprising pivoting the transfer conveyor relative to the box discharge conveyor such that the input end is moved upward and downward along an arcuate path.

12. The method of claim 9, further comprising extending the transfer conveyor to increase a length of the transfer conveyor between the input and output ends.

13. The method of claim 9, further comprising retracting the transfer conveyor to decrease the length of the transfer conveyor between the input and output ends.

14. The method of claim 9, wherein the platform lift comprises a U-shaped platform.

15. The method of claim 14, wherein the U-shaped platform surrounds the pallet location on exactly three sides.

16. The method of claim 9, further comprising, after all of the boxes have been transferred from the pallet, using an empty pallet handling system comprising a pallet lifting device to move the pallet from the pallet location to an empty pallet conveyance means that is arranged and operable to convey the pallet away from the depalletization system.

* * * * *